(12) United States Patent
Chang (10) Patent No.: US 11,079,657 B1
(45) Date of Patent: Aug. 3, 2021

(54) DISPLAY MODULE

(71) Applicants: Inventec (Pudong) Technology Corporation, Shanghai (CN); INVENTEC CORPORATION, Taipei (TW)

(72) Inventor: Yu-Cheng Chang, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 0 days.

(21) Appl. No.: 17/005,312

(22) Filed: Aug. 28, 2020

(30) Foreign Application Priority Data

Jun. 10, 2020 (CN) .......................... 202010525413.7

(51) Int. Cl.
*G03B 11/04* (2021.01)
*G06F 1/16* (2006.01)
*H04N 5/225* (2006.01)

(52) U.S. Cl.
CPC .......... *G03B 11/043* (2013.01); *G03B 11/041* (2013.01); *G03B 11/045* (2013.01); *G06F 1/1605* (2013.01); *G06F 1/1686* (2013.01); *H04N 5/2254* (2013.01); *H04N 5/2257* (2013.01)

(58) Field of Classification Search
CPC .. G06F 1/1686; G06F 1/1605; H04M 1/0264; G03B 11/041; G03B 11/043; G03B 11/045; H04N 5/2254; H04N 5/2257
See application file for complete search history.

(56) References Cited

U.S. PATENT DOCUMENTS

| | | | | |
|---|---|---|---|---|
| 7,581,893 | B2* | 9/2009 | Miramontes | G03B 17/00 396/448 |
| 8,896,754 | B2* | 11/2014 | Mundt | H04N 5/2251 348/373 |
| 9,019,420 | B2* | 4/2015 | Hurst | H04B 1/3888 348/337 |
| 9,124,792 | B2* | 9/2015 | Barangan | G03B 31/00 |
| 9,176,364 | B2* | 11/2015 | Vance | H04N 5/2254 |
| 9,369,170 | B2* | 6/2016 | Sorrentino | H04M 1/185 |
| 9,411,379 | B2* | 8/2016 | Rinner | G03B 11/041 |

(Continued)

FOREIGN PATENT DOCUMENTS

| | | |
|---|---|---|
| CN | 203037973 U | 7/2013 |
| TW | 201935117 A | 9/2019 |

(Continued)

*Primary Examiner* — Nidhi Thaker
(74) *Attorney, Agent, or Firm* — CKC & Partners Co., LLC (57) ABSTRACT

A display module including upper case, front case, blocking ribs, image-capturing opening, and blocking component is provided. The front case connects the upper case. The holding ribs are from on inner side of the upper case, and a guiding area is remained between the front case and the ribs. The image-capturing opening is formed on the front case. The blocking component is disposed on the inner side of the upper case and the front case. The blocking component has guiding part and blocking part. The guiding part is located on the guiding area. The guiding part has protrusions and compressible openings being adjacent to the ribs. Each of the compressible openings is corresponded to one of the protrusions. The protrusions exceed the guiding area. The blocking component is adjacent to the inner side of the front case and the image-capturing opening.

10 Claims, 10 Drawing Sheets

(56) References Cited

U.S. PATENT DOCUMENTS

| | | | | |
|---|---|---|---|---|
| 9,465,276 B2* | 10/2016 | Jonsson | | G06F 1/1686 |
| 9,571,708 B2* | 2/2017 | Haddad | | G03B 11/043 |
| 9,591,192 B2* | 3/2017 | Haddad | | G03B 31/00 |
| 9,829,770 B1* | 11/2017 | Gustaveson, II | | H04N 5/2257 |
| 10,070,021 B1* | 9/2018 | Rolle | | H04N 5/2252 |
| 10,154,183 B2* | 12/2018 | Haddad | | G02F 1/0102 |
| 10,317,776 B2* | 6/2019 | Gustaveson, II | | G03B 11/043 |
| 10,481,469 B2* | 11/2019 | Chen | | G03B 11/043 |
| 10,761,404 B2* | 9/2020 | Leimer | | G03B 11/041 |
| 10,816,878 B2* | 10/2020 | Miller | | G03B 11/045 |
| 2008/0187303 A1* | 8/2008 | Ito | | H04N 5/2256 |
| | | | | 396/155 |
| 2010/0079661 A1* | 4/2010 | Lin | | H04N 5/2256 |
| | | | | 348/371 |
| 2010/0087226 A1* | 4/2010 | Wu | | G03B 35/10 |
| | | | | 455/556.1 |
| 2010/0102979 A1* | 4/2010 | Huang | | G06F 1/1686 |
| | | | | 340/686.1 |
| 2011/0058255 A1* | 3/2011 | Weiss | | G03B 11/043 |
| | | | | 359/511 |
| 2011/0099908 A1* | 5/2011 | Fortmann | | G06F 1/1613 |
| | | | | 49/373 |
| 2011/0182029 A1* | 7/2011 | Wu | | G03B 11/043 |
| | | | | 361/679.55 |
| 2013/0036676 A1* | 2/2013 | Tani | | H04M 1/0264 |
| | | | | 49/414 |
| 2014/0198439 A1* | 7/2014 | De Pietro | | G06F 1/16 |
| | | | | 361/679.02 |
| 2016/0088264 A1* | 3/2016 | Freeze | | H04N 5/2252 |
| | | | | 348/143 |
| 2018/0123631 A1* | 5/2018 | Hessabi | | H04B 1/3888 |
| 2019/0258137 A1* | 8/2019 | VanTassell | | H04N 5/2254 |
| 2020/0142279 A1 | 5/2020 | Lin | | |

FOREIGN PATENT DOCUMENTS

| | | |
|---|---|---|
| TW | M585016 U | 10/2019 |
| WO | 2011130715 A2 | 10/2011 |

* cited by examiner

DISPLAY MODULE

CROSS-REFERENCE TO RELATED APPLICATION

This application claims priority to China Application Serial Number 202010525413.7, filed Jun. 10, 2020, which is herein incorporated by reference in its entirety.

BACKGROUND

Field of Invention

The present invention relates to a display module. More particularly, the present invention relates to a display module having image-capturing function.

Description of Related Art

With function of video conference, laptop with image-capturing module has been widely used in people's lives. In order to protect privacy, laptop may further include a movable blocking piece in front of the image-capturing module, so as to block image-capturing side of the image-capturing module.

However, the blocking piece may cause flipping, rotation, or stopping for couple of times during movement or sliding, causing obstructions and unsmooth user experience. Also, while the monitor is carrying the image-capturing module, the blocking piece may endure gravity in different direction after flipping the monitor, and the blocking might be stuck. Therefore, how to provide a good blocking piece is still one of the problems to be solved by those skilled in the art.

SUMMARY

The invention provides a display module having an image-capturing opening that can be closed smoothly, so as to provide good user experience.

A display module of an embodiment of the present disclosure includes upper case, front case, holding ribs, image-capturing opening, and blocking component. The front case connects the upper case. The holding ribs are formed in interior of the upper case. A guiding area is remained between the front case and the holding ribs. The image-capturing opening is formed in the front case. The blocking component is disposed inside the upper case and the front case. The blocking component has a guiding part and a blocking part. The guiding part is located in the guiding space. The guiding part has protrusions and compressible openings which are adjacent to the holding ribs. The compressible openings are corresponded to the protrusions respectively. The protrusions exceed the guiding space. The blocking part connects to the guiding part, and the blocking part is close to interior of the front case and the image-capturing opening.

In one embodiment of the present disclosure, the display module has a first long-narrow opening. The long-narrow opening is form on the upper case. The first long-narrow opening extends along a first direction. The guiding part has a holding piece. The guiding part extends along the first direction. The guiding part is adjacent to the first long-narrow opening. The holding piece passes through the first long-narrow opening.

In one embodiment of the present disclosure, the display module has first guiding ribs formed on the interior of the front case. The image-capturing opening is formed between the first guiding ribs. The blocking part has guiding trenches, and the guiding trenches are facing towards the first guiding ribs. The guiding trenches and the first guiding ribs are extended along a first direction. The guiding trenches are corresponded to the first guiding ribs respectively.

In one embodiment of the present disclosure, the holding ribs have a first holding rib and a second holding rib. The first holding rib and the second holding rib are extended along a second direction. A first distance is remained between the first holding rib and the second holding rib in a first direction. The protrusions include a first protrusion and a second protrusion. A second distance is remained between the first protrusion and the second protrusion in the first direction. The second distance is shorter than the first distance.

In one embodiment of the present disclosure, the first protrusion has a first long edge and a first short edge. The second protrusion has a second long edge and a second short edge. The first short edge is facing towards the second short edge.

In one embodiment of the present disclosure, the compressible openings include a first compressible opening and a second compressible opening. The first compressible opening and the second compressible opening are extended along a first direction. The first compressible opening is adjacent to the first protrusion, and the second compressible opening is adjacent to the second protrusion.

In one embodiment of the present disclosure, the display module has a second guiding rib formed in the interior of the front case. The second guiding rib is extended along a first direction. The blocking part is located between the second guiding rib and the upper case. An edge of the blocking part which is adjacent to the second guiding rib is parallel to the first direction.

In one embodiment of the present disclosure, the blocking part has a plurality of contacting protrusions, and the contacting protrusion are located on an edge of the blocking part which is adjacent to the second guiding rib.

In one embodiment of the present disclosure, the blocking part has a blocking plane, and the blocking plane is located at a side of the blocking part which is adjacent to front case, and an area of the blocking plane is larger than an area of the image-capturing opening.

In one embodiment of the present disclosure, the holding ribs are extended along a second direction, and the protrusions are located between the compressible openings and the holding ribs in the second direction.

As seen above, the blocking component of embodiments of the present disclosure has protrusions and compressible openings, so as to slide in the guiding space.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Laptop can utilize display modules of embodiments of the present disclosure, but the present disclosure is not limited thereto. In other embodiment of the present disclosure, computer monitor or television can utilize the display module.

Although the terms first, second, third, etc. may be used herein to describe various elements, components, areas, layers, or parts, these elements, components, areas, layers, or parts should not be limited by these terms. These terms are only used to distinguish one element, component, area, layer, or part from another. For example, a first element, component, area, layer, or part could be termed a second element, component, area, layer, or part, and, similarly, a second element, component, area, layer, or part could be termed a first element, component, area, layer, or part, without departing from the scope of example embodiments.

Figure 1:
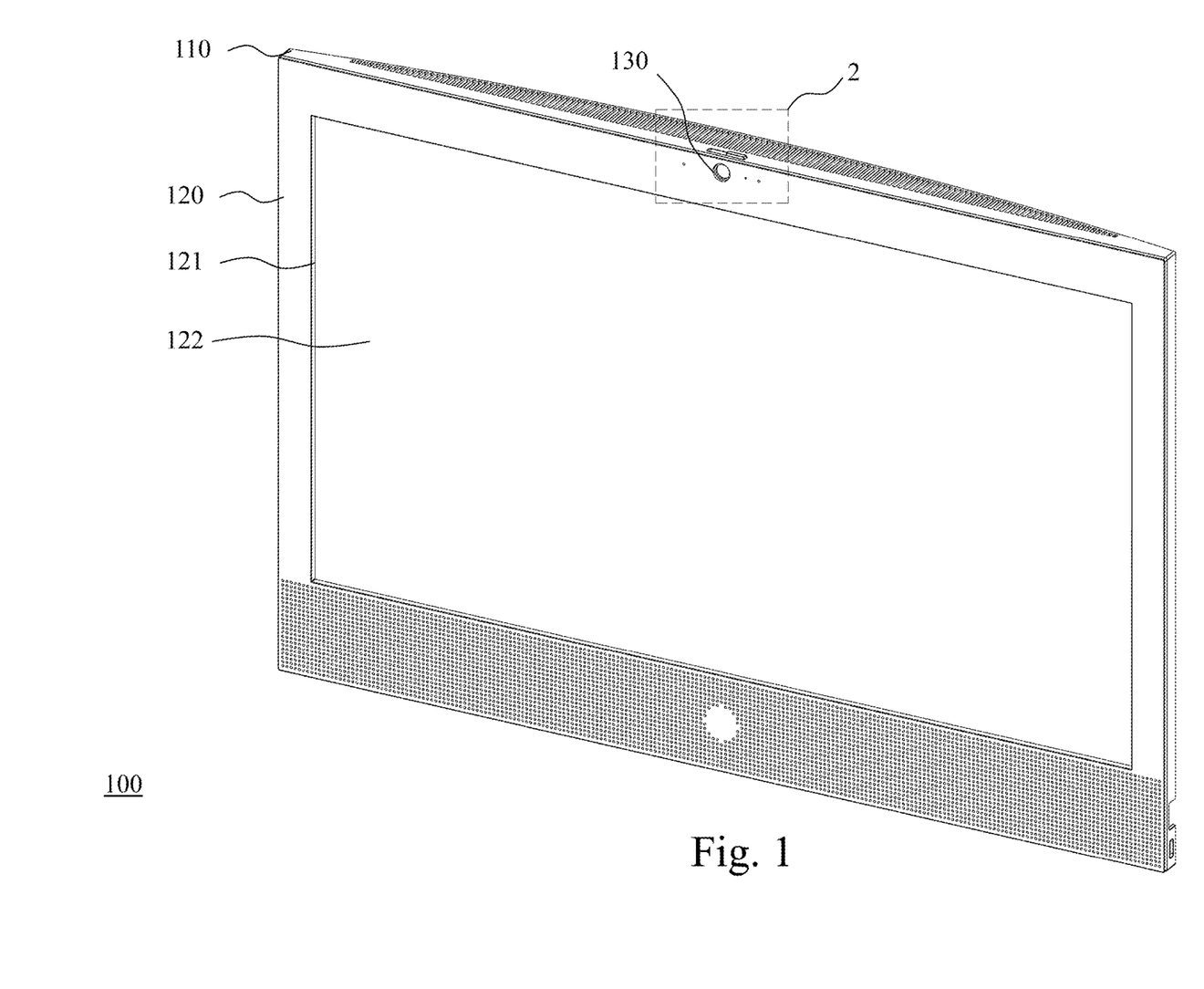
FIG. 1 is a perspective view of a display module according one embodiment of the present disclosure.

FIG. 1 is a perspective view of a display module of one embodiment of the present disclosure. Please refer to FIG. 1, in the embodiment, the display module 100 has an upper case 110 and a front case 120. The front case 120 connects to the upper case 110.

To be specific, in the embodiment, the display module 100 can further include a display device 122, and the front case 120 may have a display frame 121, and the display device 122 is located in the display frame 121. The display module 100 may further have an image-capturing opening 130, and the image-capturing opening 130 is formed on the front case 120, and the image-capturing opening 130 is adjacent to the upper case 110. For example, the display module 100 can further include an image-capturing module (not shown in FIG. 1), and an image-capturing side can be disposed in the image-capturing opening 130.

Figure 2:
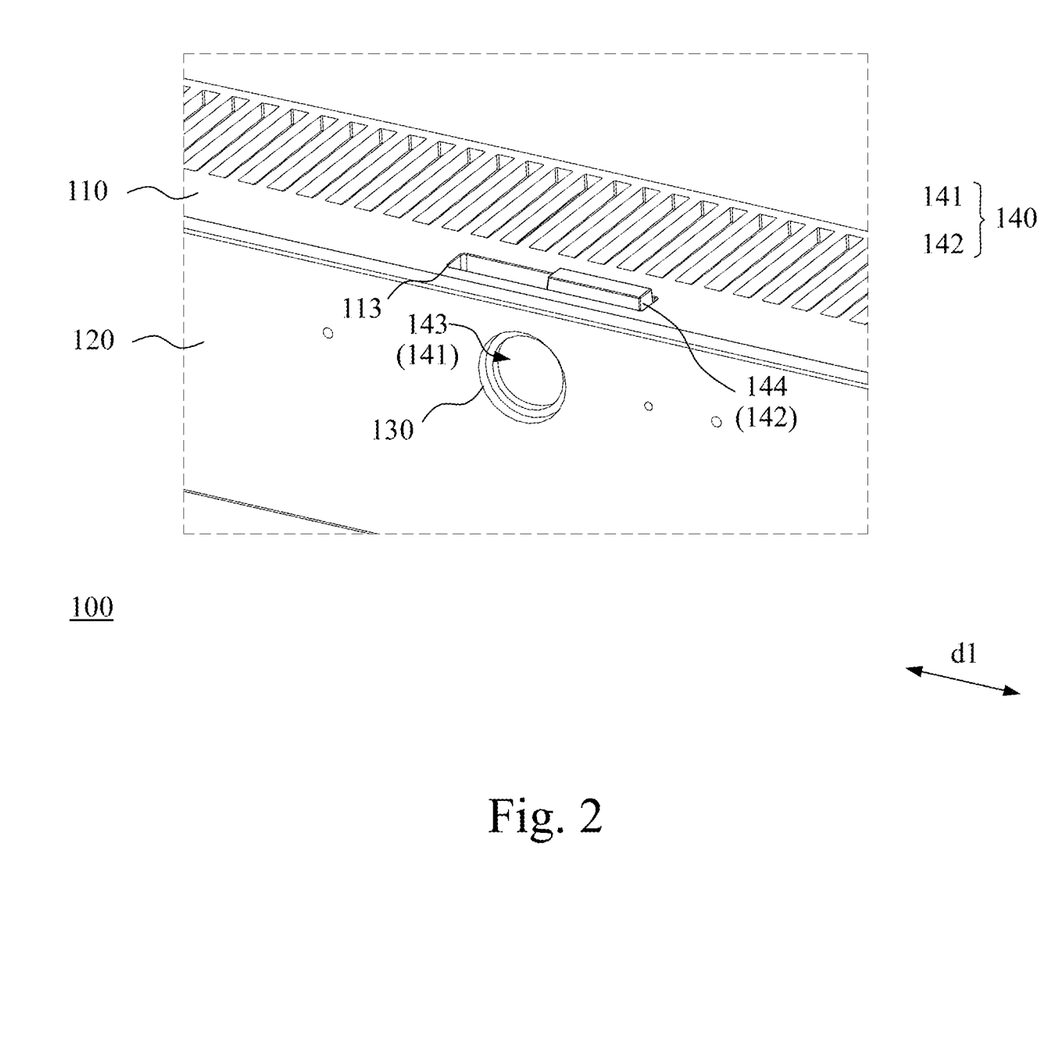
FIG. 2 is a partially enlarged view of area 2 in FIG. 1.
Figure 3:
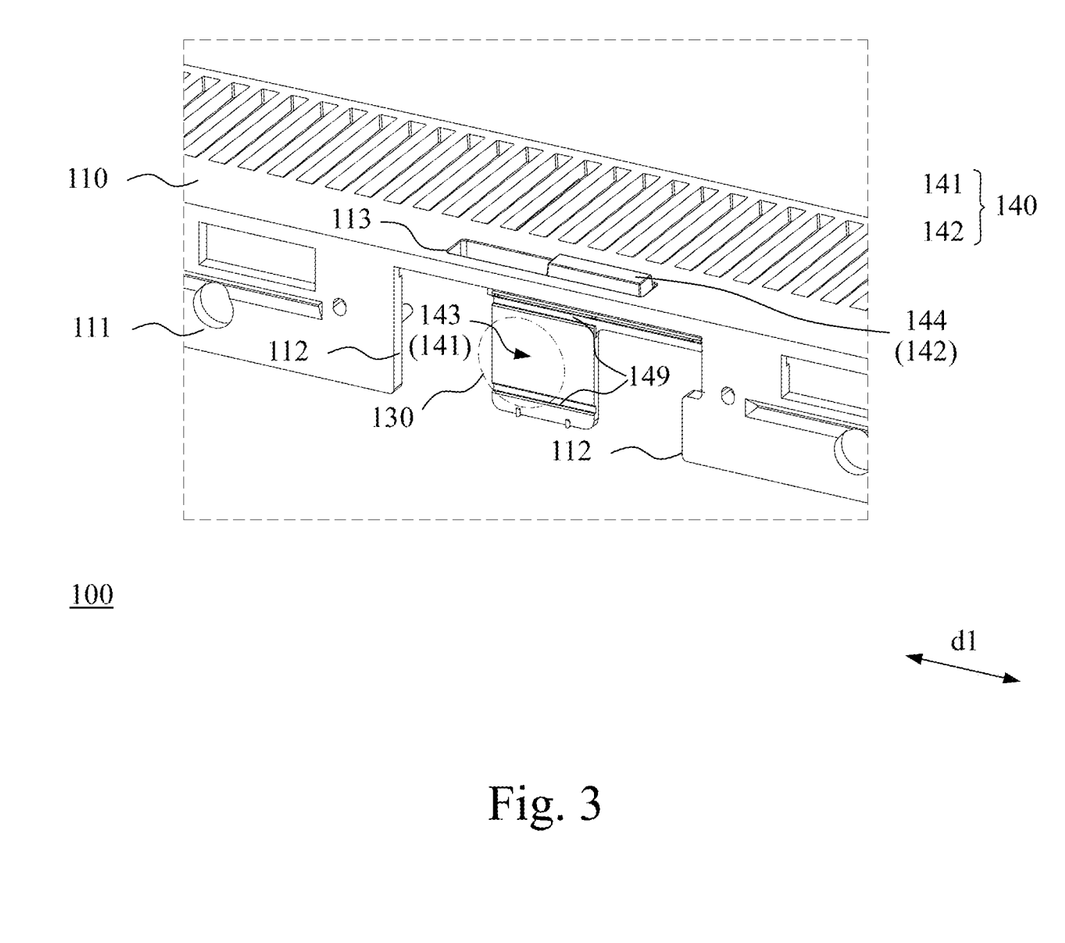
FIG. 3 is an enlarged view of one embodiment of the present disclosure omitting part of the front case.

FIG. 2 is partially enlarged view of area 2 in FIG. 1, and FIG. 3 is an enlarged view of one embodiment of the present disclosure omitting part of the front case, and the image-capturing opening 130 in FIG. 3 is illustrated in dash. Please refer to FIG. 2 and FIG. 3, the image-capturing opening 130 is formed on the front case 120. The display module 100 can further include a blocking component 140, and the blocking component 140 is disposed inside the upper case 110 and the front case 120, and the blocking component 140 is adapted to block the image-capturing opening 130 front the inside of the front case 120.

Furthermore, please refer to FIG. 3, a blocking part 141 of the blocking component 140 of the embodiment has a blocking plane 143, and the blocking plane 143 is located on a side of the blocking component 140 which is adjacent to the front case 120, and an area of the blocking plane 143 is larger than an area surrounded by the image-capturing opening 130. Therefore, the blocking component 140 can block the image-capturing opening 130 with the blocking part 141, but the disclosure is not limited thereto. In other embodiments of the present disclosure, material and shape of the blocking plane 143 may be modified as required.

To be specific, the blocking component 140 of the embodiment has a blocking part 141 and a guiding part 142. The blocking part 141 is adjacent to the front case 120, and the blocking part 141 is adapted to cover the image-capturing opening 130. The guiding part 142 is adjacent to the upper case 110. In the embodiment, the guiding part 142 is adapted to guide the blocking component 140 along first direction d1, so as to move the blocking part 141 away from the image-capturing opening 130.

Also, the upper case 110 of the embodiment has a vertical wall 111, which is substantially parallel to the front case 120 and connected to the front case 120. The vertical wall 111 has an accommodation groove 112, which surrounds an area that is larger than the area surrounded by the image-capturing opening 130, and the areas are overlapped. Therefore, the blocking component 140 can slide in the accommodation groove 112, so as to cover or move away from the image-capturing opening 130.

Furthermore, display module 100 of the embodiment further have a first long-narrow opening 113, and the first long-narrow opening 113 is formed on the upper case 110, and the first long-narrow opening 113 is extended along the first direction d1. The guiding part 142 of the blocking component 140 has a holding piece 144. The guiding part 142 is also extended along the first direction d1. The guiding part 142 is adjacent to the first long-narrow opening 113, and the holding piece 144 can pass through the first long-narrow opening 113. Therefore, user can move the blocking component 140 by pushing the holding piece 144, but the present disclosure is not limited thereto. In other embodiments of the present disclosure, the blocking component 140 can have other structures passing through the upper case 110 and the front case 120, and the blocking component 140 may also connected to pushing components on the upper case 110 and front case 120, so as to move the blocking component 140 along the first direction d1.

Figure 4:
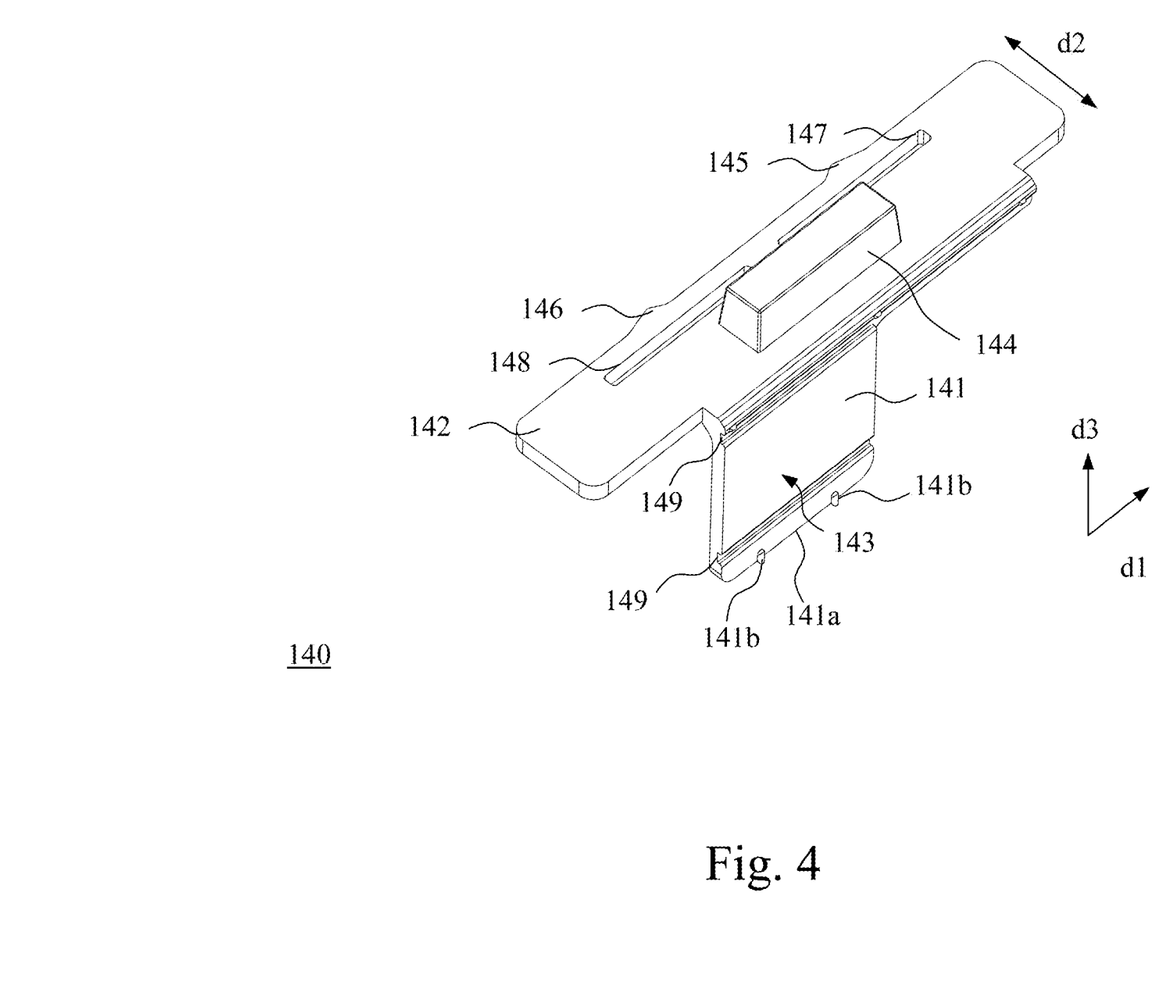
FIG. 4 and FIG. 5 are perspective view of a blocking component according to one embodiment of the present disclosure.
Figure 5:
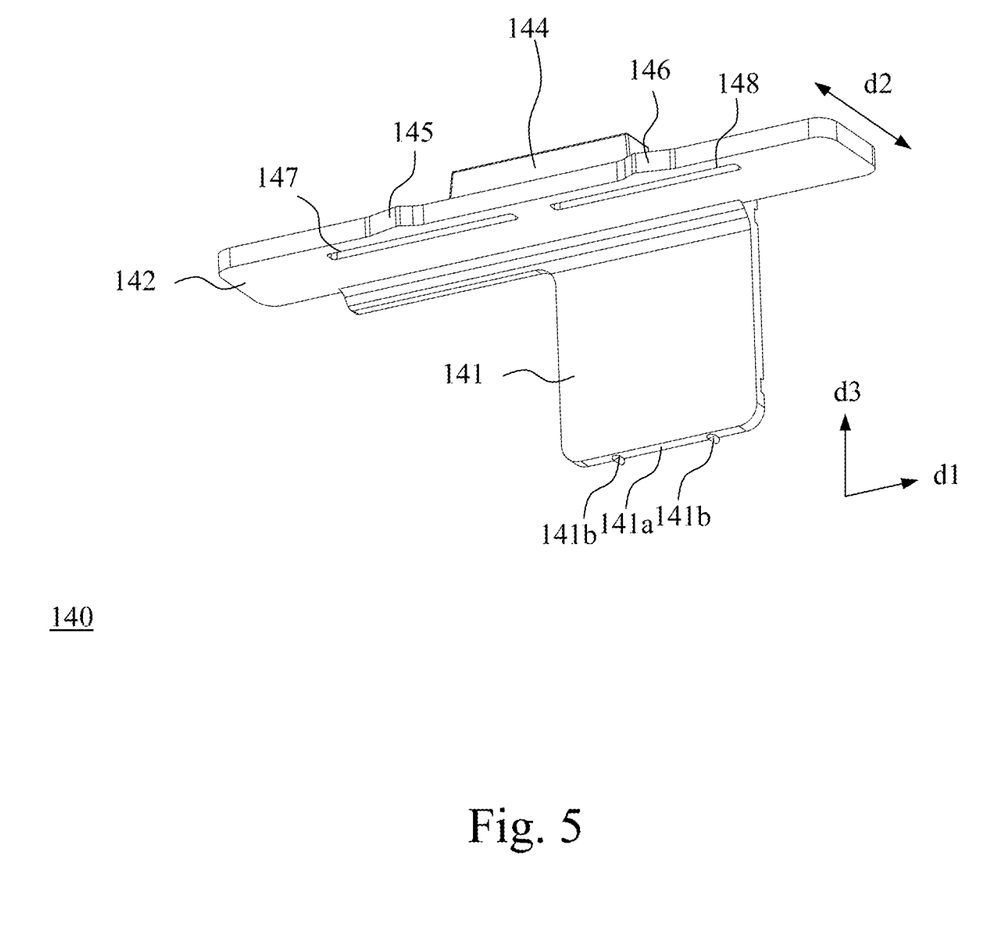

FIG. 4 and FIG. 5 are perspective view of a blocking component according to one embodiment of the present disclosure, and the FIG. 4 is front view, and the FIG. 5 is rear view. Please refer to FIG. 4 and FIG. 5, in the embodiment, guiding part 142 of the blocking component 140 has protrusions 145, 146 and compressible openings 147, 148, and the protrusions 145, 146 are corresponded to the compressible openings 147, 148 respectively.

To be specific, protrusions of the blocking component 140 include a first protrusion 145 and a second protrusion 146, and the compressible openings include a first compressible opening 147 and a second compressible opening 148, and the first compressible opening 147 is adjacent to the first protrusion 145, and the second compressible opening 148 is adjacent to the second protrusion 146. Moreover, the first compressible opening 147 and the second compressible opening 148 are extended along the first direction d1. Location of the first protrusion 145 is corresponded to location of the first compressible opening 147, and location of the second protrusion 146 is corresponded to location of the second compressible opening 148.

Therefore, in the second direction d2, the first compressible opening 147 may be compressed while the first protrusion 145 is pressed by external force, and the second compressible opening 148 may be compressed while the second protrusion 146 is pressed by external force. The second direction d3 is perpendicular to the first direction d1 and the third direction d3, and the third direction d3 is parallel to a normal of a surface 142s of the guiding part 142 of the blocking component 140. The holding piece 144 protrudes along the third direction d3.

Figure 6:
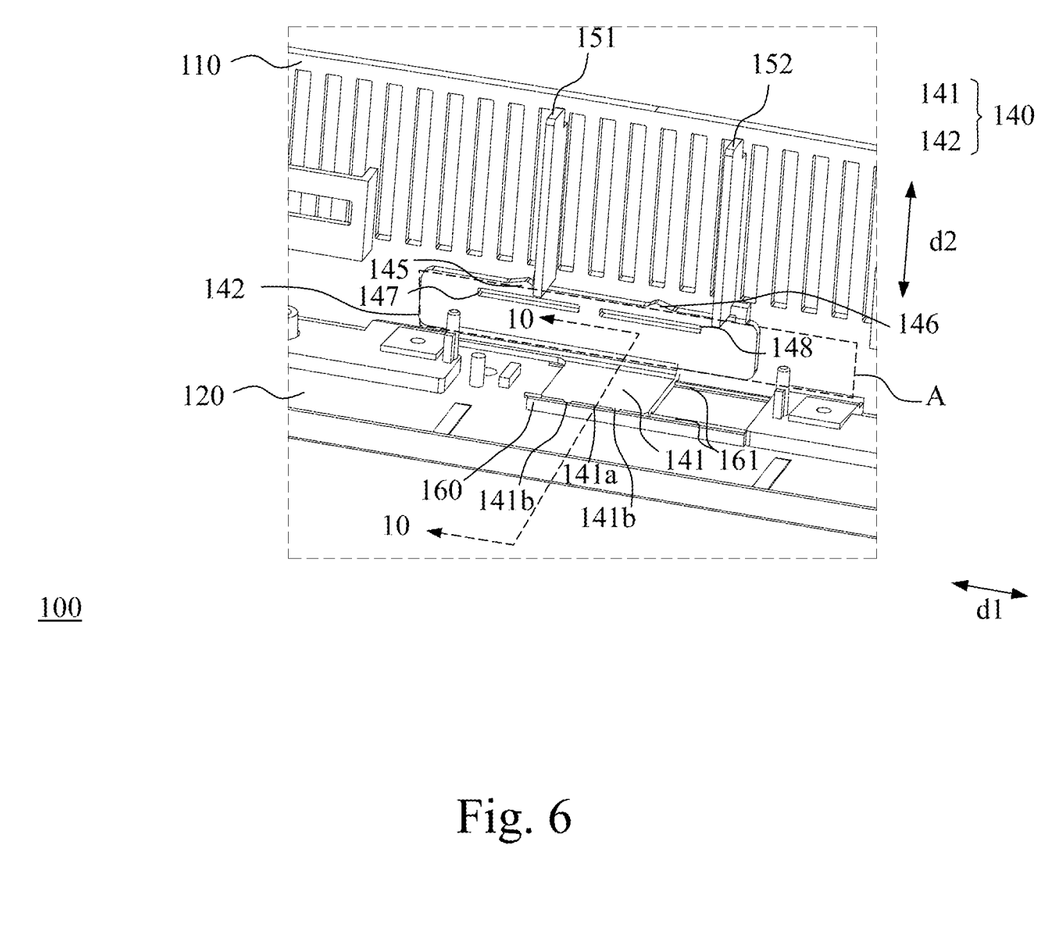
FIG. 6 is an partially enlarged view of a display module according to one embodiment of the present disclosure.
Figure 7:
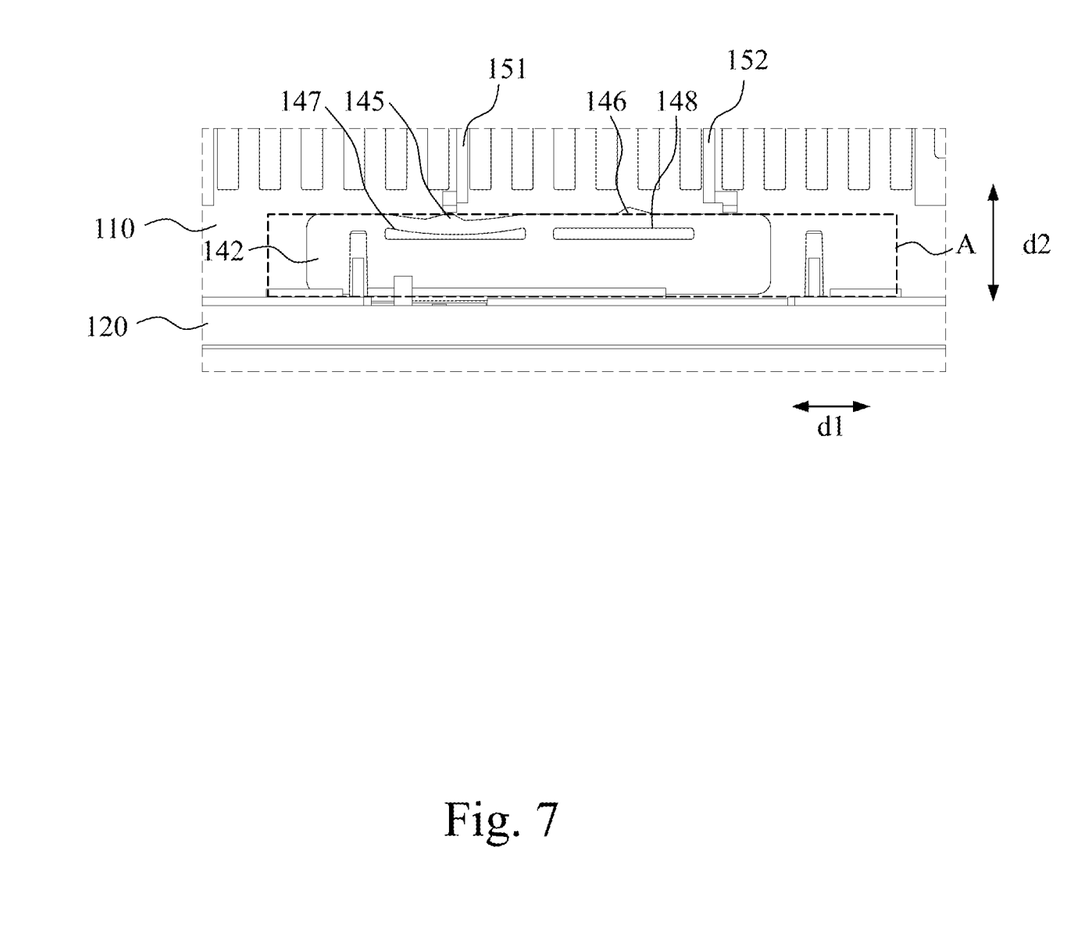
FIG. 7 to FIG. 9 are plan views of display module according to one embodiment of the present disclosure.
Figure 8:
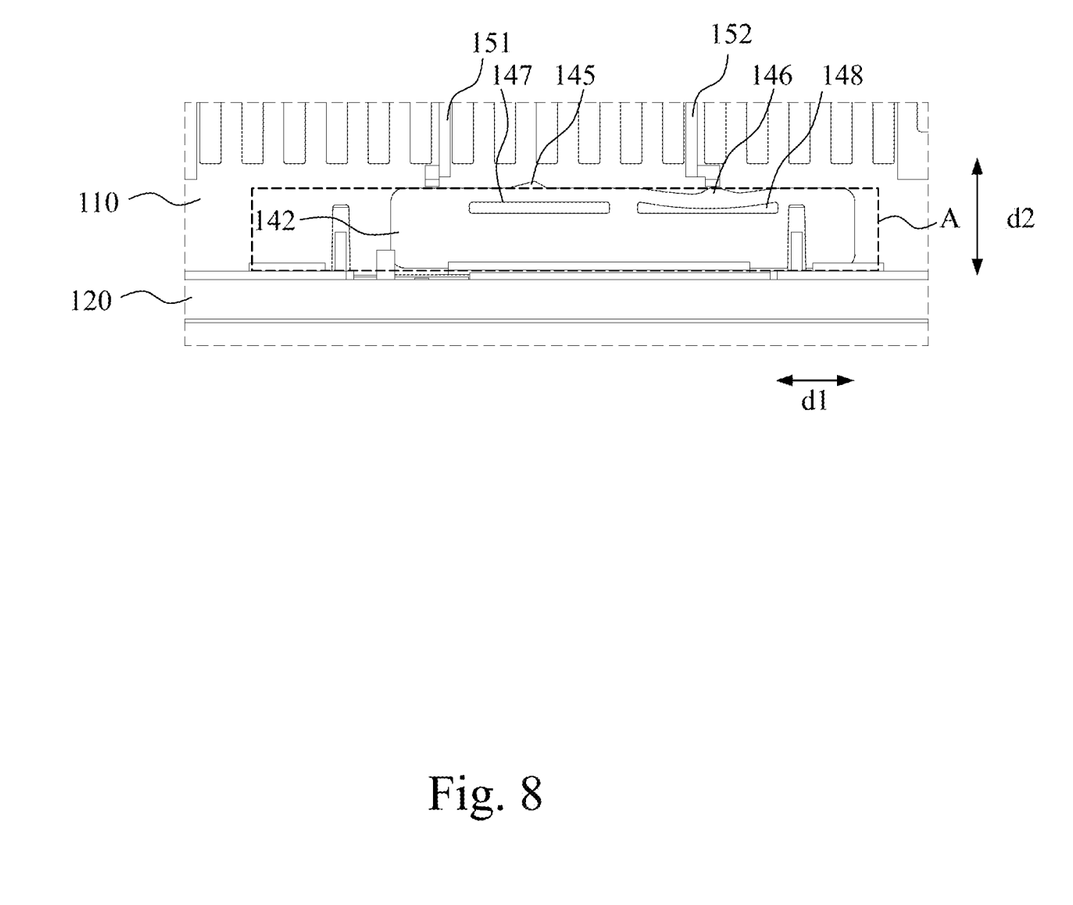
Figure 9:
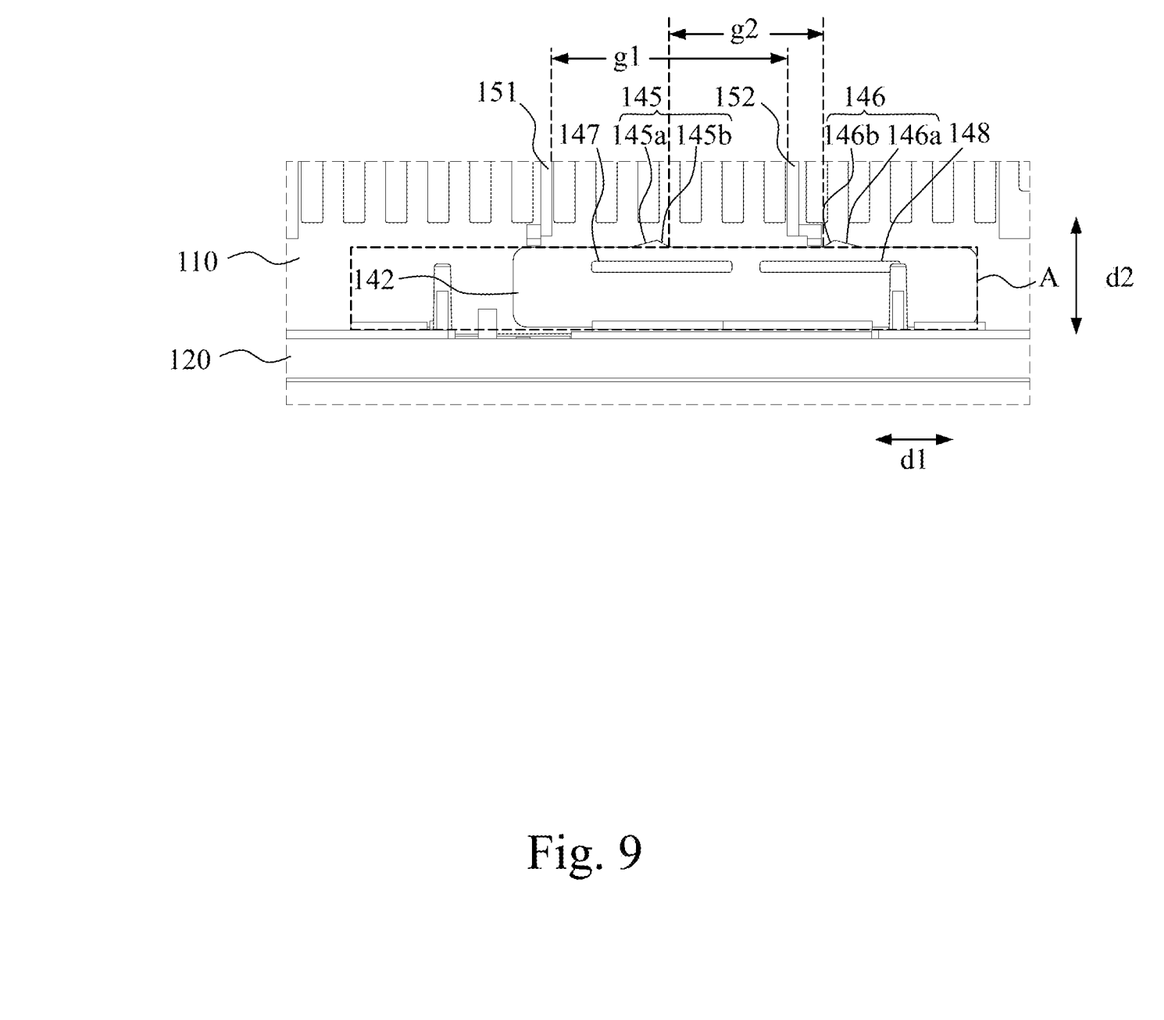

FIG. 6 is a partially enlarged view of a display module according to one embodiment of the present disclosure, and FIG. 6 is facing towards the interior of the upper case 110 and the front case 120. FIG. 7 to FIG. 9 are plan views of display module according to one embodiment of the present disclosure, and FIG. 7 to FIG. 9 are plan view in series while the blocking component 140 is moving inside the upper case 110 and the front case 120. Please refer to FIG. 6, in the embodiment, the display module 100 has a plurality of holding ribs 151, 152, which are formed inside the upper case 110, and a guiding area A is remained between the front case 120 and the holding ribs 151, 152.

The guiding part 142 of the blocking component 140 is located in the guiding area A, and the guiding part 142 has protrusions 145, 146 and compressible openings 147, 148, which are located on a side of the guiding part 142 being adjacent to the holding ribs 151, 152, and the protrusions 145, 146 exceed the guiding area A. The guiding part 142 may be thrusting the holding ribs 151, 152, and the blocking part 141 may be thrusting the front case 120. Therefore, the blocking component 140 may be affixed on the inside of the upper case 110 and the front case 120 by the blocking part 141 and the guiding part 142.

Also, the protrusions 145, 146 can hold position of the blocking component 140 in the first direction d1. Please refer to FIG. 7, while the blocking component 140 is moving in the first direction d1, the first holding rib 151 may push the first protrusion 145 and press the first compressible opening 147, so as to move the blocking part (not shown in FIG. 7), which is adjacent to the front case 120, away from the image-capturing opening (not shown in FIG. 7).

Please refer to FIG. 8, while the blocking component 140 is moving along the first direction d1, the second holding rib 152 may push the second protrusion 146 and press the second compressible opening 148, so as to move the blocking part (not shown in FIG. 7) away from the image-capturing opening (not shown in FIG. 7) completely.

Please refer to FIG. 9, while the blocking component 140 further moves along the first direction d1, the second protrusion 146 can be moved to a side of the holding rib 152 and hold the position of the blocking component 140 in the first direction d1, and keep the image-capturing opening open. Also, please refer to FIG. 6, while the first protrusion 145 is moved to a side of the first holding rib 151, which is away from the second holding rib 152, the first protrusion 145 can hold the position of the blocking component 140 in the first direction d1, and keep the image-capturing opening closed.

Therefore, in the display module 100 of the embodiment, the image-capturing opening 130 (please refer to FIG. 3) on the front case 120 can be covered by the blocking part 141 (please refer to FIG. 3) of the blocking component 140, and the guiding part 142 of the blocking component 140 can guide the blocking component 140 along the first direction d1 smoothly. The protrusions 145, 146 can hold the position of the blocking component 140, so as to keep the image-capturing opening 130 closed or open. Also, the protrusions 145, 146 can compress the compressible openings 147, 148 respectively, and the blocking component 140 can prevent from being caught by the holding ribs 151, 152 during the movement, providing good user experience. In an embodiment of the present disclosure, a laptop can utilize the display module.

To be specific, the first holding rib 151 and the second holding rib 152 of the embodiment are extended along the second direction d2, and a first distance g1 is remained between the first holding rib 151 and the second holding rib 152 in the first direction d1. A second distance g2 is remained between the first protrusion 145 and the second protrusion 146 of the blocking component 140 in the first direction d1. The second distance g2 is shorter than the first distance g1, and, therefore; the protrusions 145, 146 can hold the blocking component 140 in proper position.

Furthermore, please refer to FIG. 9, the first protrusion 145 has a first long edge 145a and a first short edge 145b, and the second protrusion 146 has a second long edge 146a and a second short edge 146b, and the first long edge 145a, the second long edge 146a, the first short edge 145b, and the second short edge 146b are tilted against the first direction d1. The first short edge 145b is facing towards the second short edge 146b. Therefore, the first short edge 145b and the second short edge 146b may trust into the first holding rib 151 and the second holding rib 152, and holding position of the blocking component 140. The blocking component 140 can provide good pushing experience with the first long edge 145a and the second long edge 146a.

Also, please refer to FIG. 6, in the embodiment, the holding ribs 151, 152 are extended along the second direction d2, the structural strength of the upper case 110 can further improve. In the second direction d2, the protrusions 145, 146 are located between the compressible openings 147, 148 and the holding ribs 151, 152. Therefore, the first holding rib 151 is adapted to push the first protrusion 145 and compress the first compressible opening 147, and the second holding rib 152 is adapted to push the second protrusion 146 and compress the second compressible opening 148.

Also, the display module 100 further includes a second guiding rib 160. The second guiding rib 160 is formed on the inside of the front case 120. The second guiding rib 160 extends along the first direction d1, and the blocking part 141 is located between the second guiding rib 160 and the upper case 110, and an edge 141a of the blocking part 141, which is adjacent to the second guiding rib 160, is parallel to the first direction d1. Therefore, the blocking component 140 can be disposed on the inside of the front case 120 with the second guiding rib 160 and moving the blocking component 140 along the first direction d1.

Furthermore, the blocking part 141 has a plurality of contacting protrusions 141b (please refer to FIG. 4 and FIG. 5), and the contacting protrusions 141b are located on an edge 141a of the blocking part 141, which is adjacent to the second guiding rib 160. The contacting protrusions 141b slidably contact the second guiding rib 160, and the blocking component 140 can move along the first direction d1 smoothly.

Figure 10:
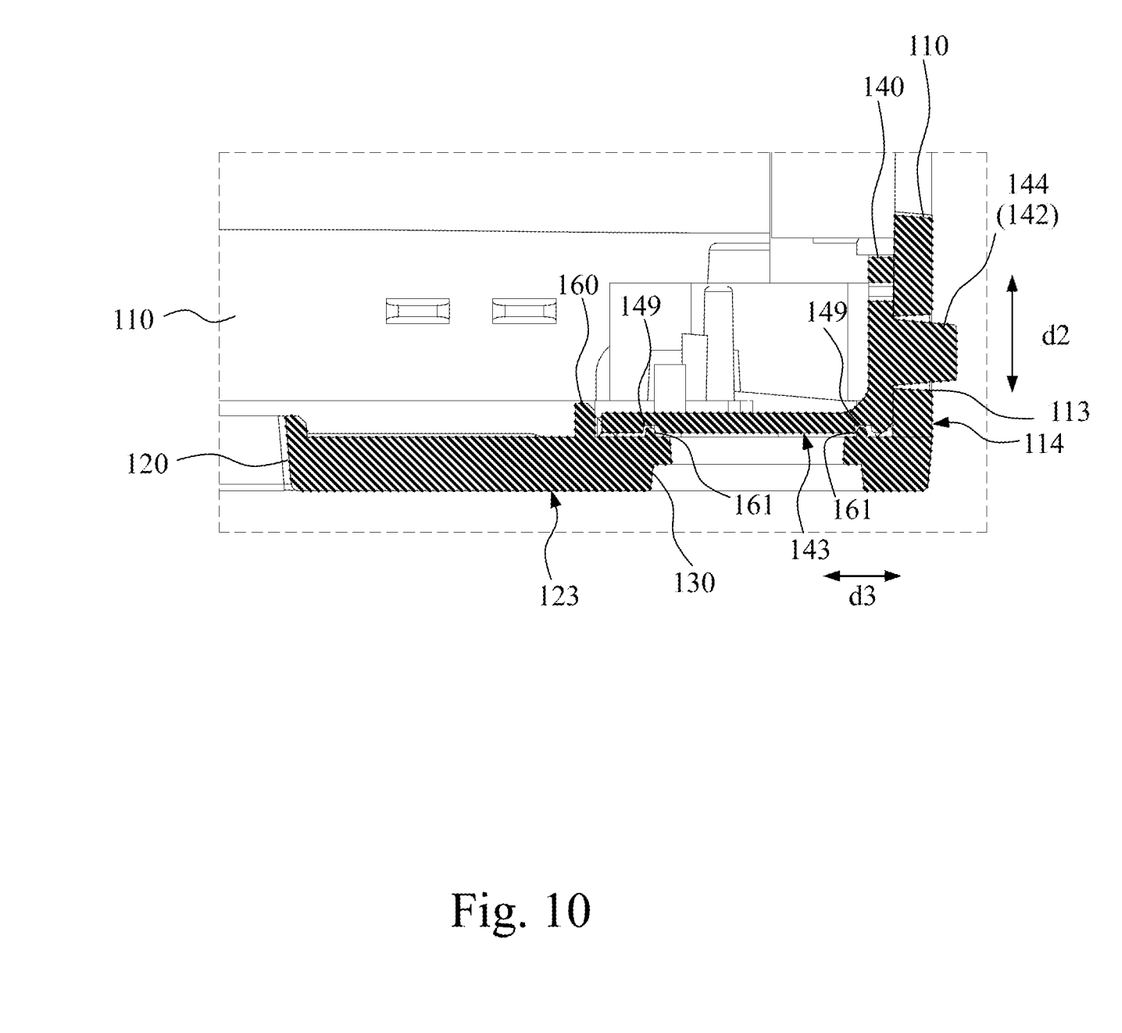
FIG. 10 is a sectional view taken along a cutting plan line 10 in FIG. 6.

Also, the display module 100 has first guiding ribs 161, and the first guiding ribs 161 formed on the interior of the front case 120, and the first guiding ribs 161 extend along the first direction d1. The blocking part 141 has a plurality of guiding trenches 149 (please refer to FIG. 4), and the guiding trenches 149 extend along the first direction d1. The first guiding ribs 161 are formed on the inside of the front case 120. FIG. 10 is a sectional view taken along a cutting plan line 10 in FIG. 6. Please refer to FIG. 10, in the embodiment, the image-capturing opening 130 is located between the first guiding ribs 161, and the guiding trenches 149 of the blocking part 141 face towards the first guiding ribs 161. The first guiding ribs 161 are corresponded to the guiding trenches 149 respectively, and movement of the blocking component 140 on the inside of the front case 120 can be guided.

In the embodiment, the holding piece 144 of the guiding part 142 protrudes from the first long-narrow opening 113 of the upper case 110 along the third direction d3, and the holding piece 144 is adapted to be push by user.

The front case 120 has front surface 123 facing outward, and the upper case 110 has upper surface 114 facing outward. The front surface 123 and the blocking plane 143 of the blocking component 140 are parallel, and the blocking plane 143 can completely cover the image-capturing opening 130. The upper surface 114 is perpendicular to the front surface 123, and the second guiding rib 160 can affix the blocking component 140 on the inside of the upper case 110 and the front case 120 with the holding ribs 151, 152 (please refer to FIG. 6).

To sum up, in the display module of the present disclosure, blocking component can slide in guiding area, which is formed by the holding ribs, on the inside of the upper case with the protrusions and the compressible openings, so as to move the blocking component smoothly, and user can have a good experience. Also, in the process of flipping the display module, the movement of the blocking component will not be affected by the change of the direction of gravity.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display module, comprising: an upper case; a front case connecting the upper case; a plurality of holding ribs formed in an interior of the upper case, wherein a guiding area is remained between the front case and the holding ribs; an image-capturing opening being formed in the front case; and a blocking component being disposed inside the upper case and the front case, wherein the blocking component comprises: a guiding part being located in the guiding area, and the guiding part has a plurality of protrusions and a plurality of compressible openings which are adjacent to the holding ribs, and the compressible openings are corresponded to the protrusions respectively, and the protrusions exceed the guiding space; and a blocking part connecting the guiding part, and the blocking part is close to an interior of the front case and the image-capturing opening.

2. The display module of claim 1 further comprising a first long-narrow opening being formed in the upper case, wherein the first long-narrow opening extends along a first direction, and the guiding part has a holding piece, and the guiding part extends along the first direction, and the guiding part is adjacent to the first long-narrow opening, and the holding piece passes through the first long-narrow opening.

3. The display module of claim 1 further comprising a plurality of first guiding ribs formed on the interior of the front case, wherein the image-capturing opening is formed between the first guiding ribs, and the blocking part has a plurality of guiding trenches, and the guiding trenches are facing towards the first guiding ribs, and the guiding trenches and the first guiding ribs are extended along a first direction, and the guiding trenches are corresponded to the first guiding ribs respectively.

4. The display module of claim 1, wherein the plurality of holding ribs includes a first holding rib and a second holding rib, and the first holding rib and the second holding rib are extended along a second direction, and a first distance is remained between the first holding rib and the second holding rib in a first direction, and the plurality of protrusions includes a first protrusion and a second protrusion, and a second distance is remained between the first protrusion and the second protrusion in the first direction, and the second distance is shorter than the first distance.

5. The display module of claim 4, wherein the first protrusion has a first long edge and a first short edge, and the second protrusion has a second long edge and a second short edge, and the first short edge is facing towards the second short edge.

6. The display module of claim 4, wherein the plurality of compressible openings include a first compressible opening and a second compressible opening, and the first compressible opening and the second compressible opening are extended along a first direction, and the first compressible opening is adjacent to the first protrusion, and the second compressible opening is adjacent to the second protrusion.

7. The display module of claim 1 further including a second guiding rib formed in the interior of the front case, wherein the second guiding rib is extended along a first direction, and the blocking part is located between the second guiding rib and the upper case, and an edge of the blocking part which is adjacent to the second guiding rib is parallel to the first direction.

8. The display module of claim 7, wherein the blocking part has a plurality of contacting protrusions, and the contacting protrusions are located on an edge of the blocking part which is adjacent to the second guiding rib.

9. The display module of claim 1, wherein the blocking part has a blocking plane, and the blocking plane is located at a side of the blocking part which is adjacent to the front case, and an area of the blocking plane is larger than an area of the image-capturing opening.

10. The display module of claim 1, wherein the holding ribs are extended along a second direction, and the protrusions are located between the compressible openings and the holding ribs in the second direction.

* * * * *